Aug. 13, 1957    M. F. HOEPFNER    2,802,365
MECHANICAL BI-STABLE DEVICES
Filed Nov. 22, 1952
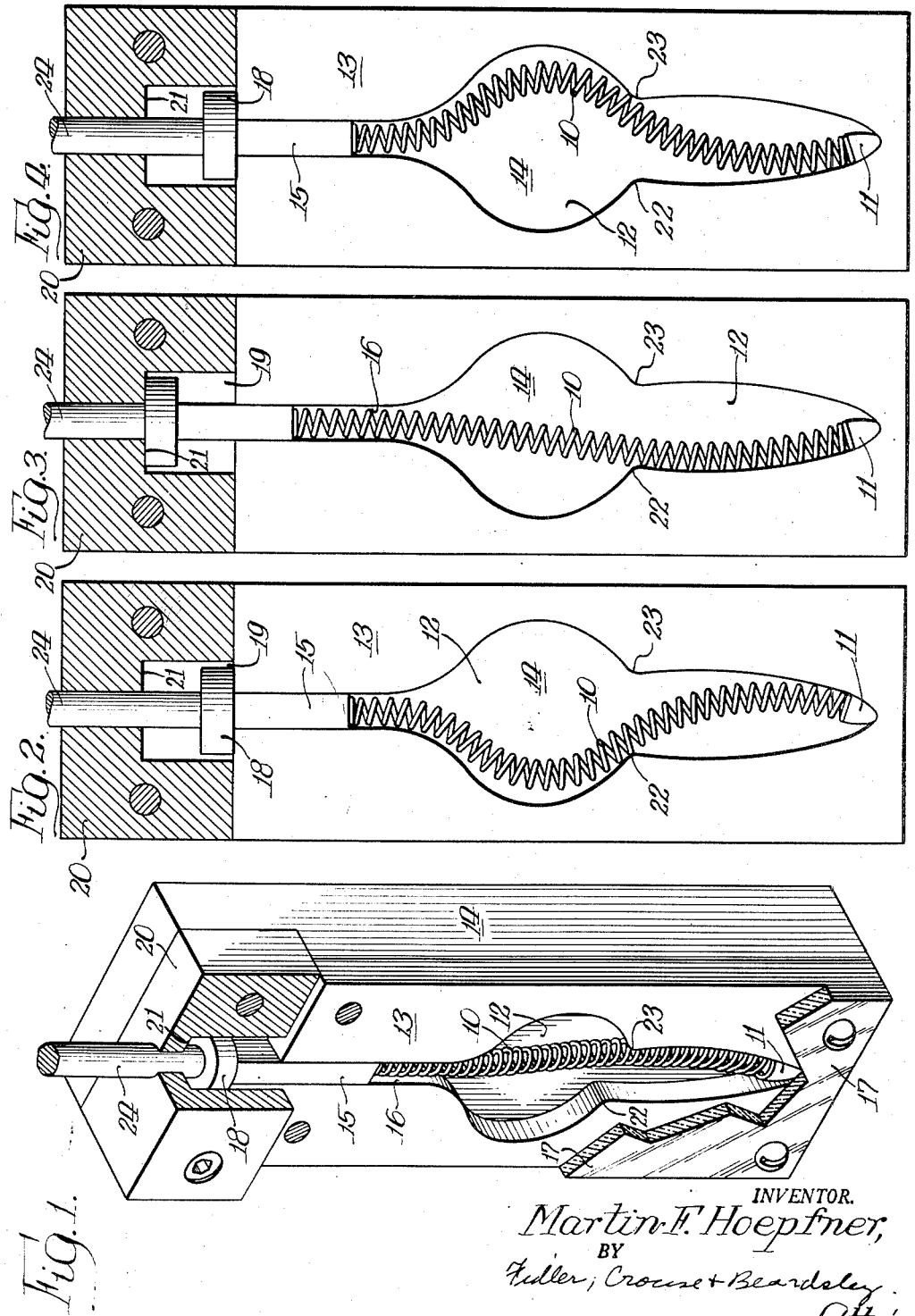
INVENTOR.
Martin F. Hoepfner,
BY
Fidler, Crouse & Beardsley
Atty's.

United States Patent Office 2,802,365
Patented Aug. 13, 1957

2,802,365

MECHANICAL BI-STABLE DEVICES

Martin F. Hoepfner, Millville, N. J., assignor to Burroughs Corporation, Detroit, Mich., a corporation of Michigan Application November 22, 1952, Serial No. 322,080

6 Claims. (Cl. 74—100)

This invention relates to improvements in mechanical bi-stable devices of the kind comprising an elastically flexible spring member which, during repeated operation of the device from each stable condition to the other, is alternately bowed in opposite directions. Bi-stable devices of that kind are disclosed in Patent No. 2,658,972, issued November 10, 1953, to Edgar Alan Brown.

An object of the present invention is to provide a bi-stable device of that kind with a spring member having a greatly increased operating life.

The foregoing and other objects and advantages of the invention will become apparent from the following description of a preferred embodiment of the invention illustrated in the annexed drawings in which:

Fig. 1 is a perspective view of a bi-stable device embodying the invention, with portions broken away to show more clearly certain structural features of the device, and showing the device in one of its two stable conditions; and Figs. 2 to 4, inclusive, are side elevations with a side cover member removed, Fig. 3 showing the other of the two stable conditions of the device and Figs. 2 and 4 showing the device in intermediate conditions during operations.

Each of the bi-stable devices disclosed in the above-mentioned application comprises an elongated, elastically flexible spring member supported at one end pivotally by one support and non-pivotally at its other end by another support, one of the supports being movable toward and from the other and the maximum separation of the supports being restricted to limit maximum separation of the ends of the spring member to less than the length of the spring member so as to cause the spring member to be bowed away from a straight line through its ends. Confining means located on opposite sides of said line are so positioned as, during each movement of the movable support toward the other support, to block increased bowing and movement away from said line of the portion of the spring member extending from its pivotally supported end to a point in its length a short distance beyond the point farthest displaced from said line, to thereby compel a portion of said spring member nearer to the non-pivotally supported end thereof to be increasingly bowed in the opposite direction and shifted progressively across said line by such movement of the movable support until the spring member reaches an unstable, substantially sinuous form and position from which it can spontaneously shift further in the same sense and, upon reverse movement of the movable support, spontaneously transform to the form and position reversed, with respect to said line, from the form and position it had prior to such reciprocation of the movable support.

In each of the bi-stable devices disclosed in the above-mentioned application, the spring element is an elongated normally straight elastically flexible member. In accordance with the present invention, the spring member is a length of open-wound coil spring.

The bi-stable device shown by way of example in the annexed drawings comprises a helical coil spring 10 having a length many times the diameter of its coils. The spring is open-wound, that is, the pitch of the helix is greater than the diameter of the spring wire or the like of which the spring is formed. One end of the spring member 10 is provided with a pivot bearing element 11 pivotally engaged in the closed end of the aperture 12 in a housing member 13 secured to a base member 14. The other end of the spring member 10 bears against the end of a plunger 15 longitudinally reciprocable in a guide slot 16 extending from the other end of the aperture 12 outwardly through the end of the housing member 13. The width of the guide slot 16 is such that it permits the end portion of the spring 10 located therein to move freely axially in response to reciprocations of the plunger 15 but keeps that end portion of the spring 10 co-axial with the plunger 15. The base member 14 which closes the aperture 12 at one side, and a closure plate 17 secured flat against the opposite side of the frame member 13, together prevent the spring member 10 from bowing to any substantial extent in the direction of the thickness of the frame member 13, such thickness being but slightly greater than the outer diameter of the coil spring.

The plunger 15 extends outwardly beyond the housing 13 and has on its outer end a flange 18 within a bore 19 in a further housing member 20 also secured to the base member 14. The outer end of the bore 19 is of reduced diameter to form a shoulder 21 to cooperate with the flange 18 to limit outward movement of the plunger 15 to an extent sufficient to keep the spring 10 under compression and bowed so that the spring is caused to lie against the housing member 13 at one or the other side of the narrower portion of the aperture 12. The narrower portion of the aperture 12 extends from the closed end in which the pivot bearing member 11 is supported to points 22 and 23 slightly beyond the point at which the spring member bows farthest away from a line through the pivot center of the bearing element 11 and the center of the opposite end of the spring. That line, in the illustrated device, is the extended longitudinal axis of the plunger 15 and will be referred to hereinafter for brevity as the center line. The portion of the aperture between the inner end of the guide slot 16 and the points 22 and 23 is widened to avoid interference with the portion of the spring contained in that portion of the aperture 12 during operation of the device.

Inward movement of the plunger 15 is limited by engagement of the flange 18 against the edge of the housing member 13. Such inward movement of the plunger may be effected by a rod 24 entering the bore 19 through the smaller diameter outer end thereof and actuated by any suitable means such as an electromagnet or solenoid (not shown).

The manner in which the illustrated bi-stable device operates is, in general, the same as disclosed in the above mentioned application. The spring member 10 normally maintains the plunger 15 at its outward limit of movement where the distance between the ends of the spring member is sufficiently less than the length of the spring member to bow the spring member sufficiently to place that portion of the spring member which extends from the pivot member 11 to the point 22 or 23 in light contact with the housing 13 at one or the other side of the narrower portion of the aperture 12. Inward movement of the plunger 15 tends to cause the spring member 10 to bow further away from the center line. As increased bowing in that manner is prevented by the housing 13, the portion of the spring member contained in the wider portion of the aperture 12 is forced to bow increasingly in the opposite sense across the center line and the portion of the spring member in the narrower portion of the aperture 12 progressively peels away from the engaged wall of the housing 13 until the spring member reaches an unstable substantially sinuous form and position from which it spontaneously shifts further across the center line until it encounters the housing member 13 at the opposite side of the aperture 12 where the narrower and wider portions of the aperture meet. The inward movement of the plunger 15 is limited by engagement of the flange 18 against the end of the housing member 13 when the spring member 10 has thus shifted through the above-mentioned unstable form and position.

When the plunger 15 returns outwardly to its normal position, the spring 10 transforms to the shape and position opposite that which it had at the start of the operation, that is, the curvatures are reversed so that the portion within the narrower part of the aperture 12 engages the housing along the side opposite from that which it engaged prior to the inward movement of the plunger 15. If the spring 10 were initially in the stable condition shown in Fig. 1, the inward movement of the plunger 15 would operate it to the condition of Fig. 2, from which upon return of the plunger 15 outwardly to its normal position, the spring 10 would operate to the stable condition shown in Fig. 3.

Upon a second reciprocation of the plunger, the spring 10 is again operated in a manner similar to that just described except that the curvatures and the lateral movements of the spring intermediate its ends are in the reverse sense so that the spring returns at the conclusion of the second operation, to the same form and position it had prior to the first operation. In short, the second inward movement of the plunger 15 operates the spring 10 from the stable condition of Fig. 3 to the condition of Fig. 4, from which, during the subsequent return of the plunger 15 outwardly to its normal position, the spring operates to the stable condition shown in Fig. 1.

It will be noted that in the operations of the device from each stable state to the other, the curvatures of the longitudinal axis of the portion of the spring member contained in the aperture 12 are reversed and points of zero curvature shift along the axis of the spring from a point near the plunger 15 to substantially the end provided with pivot bearing element 11.

Thus, when a simple spring consisting of a length of normally straight spring ribbon or wire is employed as in the devices disclosed in the above-mentioned application, the forces acting transversely on it to bend it pass through zero in reversing in each operation of the device. Also, the curvatures to which the spring element is bent are relatively large. When simple normally straight springs formed of the best presently available materials are employed in the bi-stable device they have an average life of the order of a few millions of operations, but it has been found that when the spring member is made in the form of a length of open wound coil spring as described above, the average life of the spring members is increased to the order of several hundreds of millions of operations. The following explanation is offered without any intention of thereby limiting the scope of the invention as claimed in the appended claims.

If an ideal open-wound helical coil spring is axially compressed without bowing its axis, all portions of the spring wire or the like of which it is formed are uniformly stressed torsionally. If however, the axis of the spring is bowed in a plane without axial compression or extension of the spring, the spring wire or the like is subjected to both torsional and bending forces which vary around each turn or coil of the helix. Assuming, for the sake of simplicity, that the spring axis lies in the intersection of a plane and a portion of a circular-cylindrical surface normal to the plane, the torsional stresses will reach maxima where the coils pass through the plane but will be in opposite directions on opposite sides of the cylindric surface, and will be zero where the coils pass through the cylindric surface. Bending stresses in the spring wire will be zero where the coils pass through the plane, will reach maxima where the coils pass through the cylindric surface and will be in opposite directions on opposite sides of the plane. If the axis of the helical spring remains in the plane but is alternately bowed in opposite directions in the plane, still without axial compression of the spring, both the bending and torsional stresses at any point in the length of the spring wire will pass through zero as the spring axis passes through a straight condition and will reverse direction as the axis is bowed in the reverse direction.

It is believed that a substantial portion of the great increase in operating life of the helical coil spring over the operating life of the simple spring bar of the prior device is due to the fact that, because the length of the spring wire or the like forming the coil spring is many times the axial length of the coil spring member 10, the forces acting on the spring wire in the coil spring per unit length of the spring material are only a very small fraction of the forces acting on the simple bar spring per unit length.

It is also believed that a large portion of the great increase in operating life of the spring member results from the fact that the spring member in accordance with the present invention is always maintained under axial compression throughout its length.

As already mentioned, the axial compression of the helical coil spring member 10 produces a torsional component of stress throughout the length of the spring wire or the like of which the spring member is formed. That component of torsional stress does not pass through zero and reverse in direction in the operation of the bi-stable device. It would appear that in any portions of the length of the spring wire at which bending stresses pass through zero and reverse in direction during the operation of the bi-stable device, torsional stresses simultaneously present will so combine with the bending stresses that the resultant stresses do not pass through zero in changing direction.

In accordance with the present invention, it is preferred to so proportion the helical coil spring 10 in relation to the distance between the pivot bearing element 11 and the inner end of the plunger 15 when the latter is at its outward limit and in relation to the extent of bowing of the spring axis that all portions of the helical spring are maintained under a compression which, at its minimum, is sufficient to produce in the spring wire or the like, of which the helical coil spring is formed, torsional stresses sufficient to prevent the net resultant stresses in substantially all portions of the length of the spring wire from passing through zero during operation of the bi-stable device. For that purpose, the minimum axial compression of the helical coil spring member 10 should be that which will produce in the spring wire or the like, a component of torsional stress which is at least equal in magnitude to the maximum value of the component of torsional stress produced in the spring wire at any point by the bowing of the spring axis. The latter component, as previously mentioned, reaches its maxima where the coils of the spring pass through the plane of the bowed spring axis. At those points, as also previously mentioned, bending stresses in the spring wire are absent so that, to prevent the net stresses from passing through zero, it is necessary to prevent the torsional stresses from reversing in direction by maintaining the axial compression of the helical spring sufficient to produce at those points, components of torsional stress at least equal to the maxima of the components of torsional stress produced by the bowing of the spring axis. Apparently, when that condition is present, the resultant of the combination of the torsional and bending components of stresses will not pass through zero as the bending components of stress reverse direction in the operation of the bi-stable device.

It is believed that the above discussed overall reduction of stresses in the spring member achieved by employing an open wound coil spring formed of a length of spring wire or the like many times greater than the length of the spring member, and the prevention of passage through zero of the resultant stresses in substantially all portions of the spring element achieved by maintaining the coil spring axially compressed at all times substantially account for the very greatly increased operating life of the spring member of the present invention. In any event, an increase in average operating life of the order of a hundred-fold is obtained by the invention.

It should be noted that the form of the coil spring member may be considerably varied without departing from the scope of the invention. For example, the axial trace of the coil may be other than circular, such as elliptical, rectangular, hexagonal or other regular or irregular shapes. Also the spring wire or the like of which the coil spring is wound, may be of other than circular cross-section. It will be apparent also that the form and construction of the bi-stable device of the present invention may be varied in the same ways in which the device of the above-mentioned application may be varied. For example, the form of frame may be varied, various output elements may be provided to operate switches or other devices, and inhibitors may be provided, as disclosed in the above-mentioned application. Various other modifications are readily apparent.

I claim:

1. In a bi-stable device of the kind comprising an elongated, elastically flexible spring member and means confining said spring member endwise and laterally, said spring member being operable alternately from each to the other of two stable conditions in which, by endwise confinement of said spring member, its axis is bowed on opposite sides, respectively, of a line through its ends, the axis of said spring having, during each such operation, at least a point of zero curvature while the curvature of said axis reverses in direction, the improvement comprising the employment, as said spring member, of a length of open-wound coil spring held in axial compression at all times by said confining means.

2. A bi-stable device comprising an elongated elastically flexible spring member in the form of a length of open-wound coil spring, means to support said spring member pivotally at one end to accommodate rocking of the adjacent portion of said spring member about said end, means to support the other end of said spring non-pivotally, means mounting one of said supporting means for movement readily toward and from the other supporting means to operatively reciprocate the thereby supported end of the spring member toward and from the other end thereof, means cooperating with the movable supporting means and positioned to limit maximum separation of the ends of the spring member to a distance less than the length of the spring member and thereby cause said spring to be bowed away from a line through the ends of the spring member, and confining means located on opposite sides of said line and positioned to block, during each movement of said movable supporting means toward the other supporting means, increased bowing and movement away from said line of the portion of said spring member extending from said pivotally supported end to a point in its length a short distance beyond the point farthest displaced from said line and thereby compel a portion of said spring member nearer to the non-pivotally supported end thereof to be increasingly bowed in the opposite direction and shifted progressively across said line by such movement of said movable supporting means until said spring member reaches an unstable substantially sinuous form and position from which it can spontaneously shift further in the same sense and, upon reverse movement of said movable supporting means to the extent permitted by said limit means, spontaneously transform to the form and position reversed, with respect to said line, from the form and position it had prior to such reciprocation of the movable supporting means, said supporting means and confining means maintaining said coil spring compressed axially at all positions of said movable supporting means.

3. A bi-stable device according to claim 2, wherein the coil spring is axially compressed by said supporting means at the maximum separation of said supporting means determined by said limit means.

4. A bi-stable device according to claim 2, wherein the limit means restrict relative movement of said supporting means to a range within which the supporting means maintain the coil spring member at all times under axial compression producing in the spring material torsional stress components which, combined with bending stress components produced by bowing of the spring axis, prevent the resultant stress in any portion of the spring material from passing through zero during operation of said spring member from either stable condition to the other.

5. A bi-stable device according to claim 2, wherein the limit means restrict relative movement of said supporting means to a range within which axial compression of said coil spring member by said supporting means produces in the spring material torsional stress components which, at their minimum values, are of greater magnitude than the torsional stress components produced by the bowing of the spring axis.

6. A bi-stable device according to claim 2, having parallel flat wall members spaced apart by slightly more than the diameter of the coil spring member on opposite sides of said coil spring member, said previously mentioned confining means being located between said flat wall members.

References Cited in the file of this patent

UNITED STATES PATENTS 2,118,792    Horton _____ May 24, 1938
2,658,972    Brown _____ Nov. 10, 1953